Figure 3:
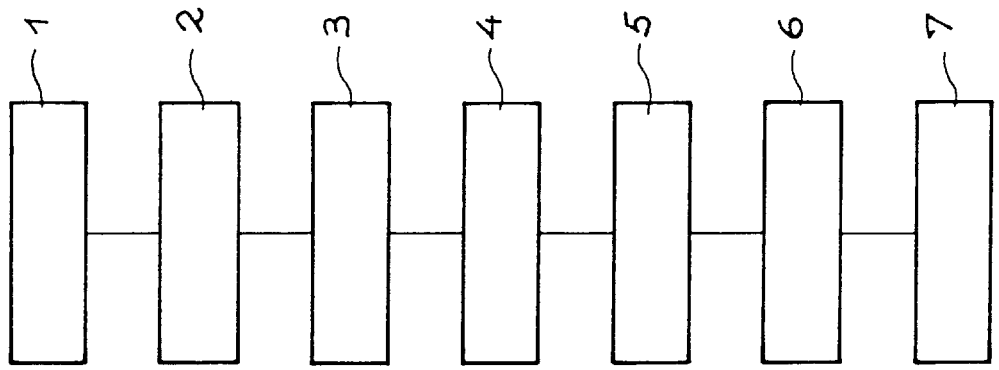

United States Patent [19]
Bigay

[11] Patent Number: 5,864,744
[45] Date of Patent: Jan. 26, 1999

[54] REACTIVE SINTERING METHOD OF FORMING INTERMETALLIC MATERIALS

[75] Inventor: Yves Bigay, Verrieres-le-Buisson, France

[73] Assignee: Commissariat A L'Energie Atomique, Paris, France

[21] Appl. No.: 664,428

[22] Filed: Jun. 18, 1996

[30] Foreign Application Priority Data

Jun. 19, 1995 [FR] France .................................. 95 07283

[51] Int. Cl.⁶ ...................................................... C21D 1/02
[52] U.S. Cl. .................................. 419/29; 419/8; 419/45; 419/49; 419/55
[58] Field of Search .................................. 419/29, 45, 49, 419/55, 8

[56] References Cited

U.S. PATENT DOCUMENTS

| | | | |
|---|---|---|---|
| 4,065,302 | 12/1977 | Turillon | 75/208 R |
| 4,765,952 | 8/1988 | Kemp, Jr. | 419/47 |
| 5,032,353 | 7/1991 | Smarsly | 419/12 |
| 5,269,830 | 12/1993 | Rabin et al. | 75/246 |
| 5,455,001 | 10/1995 | Hu | 419/38 |
| 5,701,575 | 12/1997 | Taguchi et al. | 419/28 |

FOREIGN PATENT DOCUMENTS

| | | |
|---|---|---|
| 38 09550 | 10/1989 | Germany . |
| 39 35955 | 1/1991 | Germany . |
| 2 220 425 | 1/1990 | United Kingdom . |

OTHER PUBLICATIONS

V.I. Itin, et al "Production of Titanium Nickelide by Self–Propagating . . . ".
M. Dahms "Formation of Titanium Aluminides . . . ".
K.B. Mueller, et al "Production of Intermetallical . . . ".

*Primary Examiner*—Ngoclan Mai
*Attorney, Agent, or Firm*—Michael N. Meller

[57] ABSTRACT

The object of the invention is a reactive sintering method of forming intermetallic materials such as TiNi, TiAl which includes the preparation of a mixture of elemental metallic powders in desired proportions (1) (2), the compression (3) of the mixture of these elemental powders so as to obtain a tablet of powders, then the cladding (4) of this tablet of powders in a cladding resistant to pressure and heat, the clad product then being subjected to a reactive sintering (5) to obtain the intermetallic compound and to a final hot densification operation (6) . Generally, the cladding is removed (7).

21 Claims, 1 Drawing Sheet

REACTIVE SINTERING METHOD OF FORMING INTERMETALLIC MATERIALS

The object of the invention is a reactive sintering method of forming intermetallic materials from elemental powders.

Intermetallic materials are specific compounds with an ordered structure of metals with complex bonding and complicated crystalline structures.

These materials, for example, the aluminides of titanium have for the most part, properties such as low density, high resistance to oxidation and hot toughness which make them applicable in many industrial fields where such properties are looked for, particularly the aeronautical and space industries. However, despite their interest, these intermetallic materials have the disadvantage of being difficult to form.

The forming of intermetallic materials by the classic melting route poses the following problems: it is difficult to control the chemical composition from one melt to another because of the often large differences in melting temperatures and vapour pressure existing between the chemical elements; for example, in the case of TiAl, titanium melts at 1668° C. and aluminium melts at 660° C.

These differences in composition are particularly harmful in the case of intermetallic materials, since they bring about large variations in the final properties.

It is equally difficult to control the microstructure of the material obtained. In effect, the melting causes the formation of large grains, dendrites and chemical heterogeneity within the same ingot. These difficulties mean that it is necessary to follow the forming process with a large range of hot transformation processes: forging, drawing and rolling so as to break the grains and to homogenise the ingot.

Finally, materials thus formed, pose difficulties in hot and in cold transformation processes. In effect, these materials are very difficult to transform because of the "fragile" nature of intermetallic materials, and also because of the coarse microstructure from the melting. They require high temperatures and low deformation speeds, which bring about cooling problems which mean working under isothermal conditions and at low degrees of deformation.

As a result, numerous passes and a long treatment are necessary.

Intermetallic materials can also be formed by the classic technique of powder metallurgy, namely by mixing powders, forming for example by cold compression and sintering, the powders which are used being pre-alloyed. This technique, whilst it allows to overcome the problems of chemical composition control and microstructure, nevertheless has difficulties, on the one hand of increased cost, since it is difficult to obtain pre-alloyed powders of intermetallic compounds of good chemical quality —it is necessary, in effect, to manufacture an ingot which is then atomised —and on the other hand, of a very delicate forming process, since the intermetallic powders are hard and fragile.

Powder metallurgy by reactive sintering uses elemental powders easily available, at not very high cost and because of this eliminates one of the disadvantages of classic sintering. As in the case of pre-alloyed powders, reactive sintering allows good control of the chemical composition. This technique also allows, thanks to the ductility of the elemental powders, easy forming by drawing, rolling or other process before carrying out the chemical reaction. After the reaction has lead to the synthesis of the compound, the product obtained has a fine homogeneous microstructure. However, this method has a certain number of difficulties, the main ones being: difficult control of the reaction, greater oxidation of the product during manufacture which is greatly detrimental to the final properties, and finally a residual porosity which limits to a great extent, the mechanical properties.

These difficulties mean that, in practice, this method is limited to the manufacture of small items, of low thickness, because of the difficulty of controlling the reaction, it also requires working under high vacuum in order to limit oxidation, and finally it demands that one operates with very fine powders or powders which have been subjected to welding and are therefore charged with oxygen, in order to limit the Kirkendall porosity.

Figure 1:
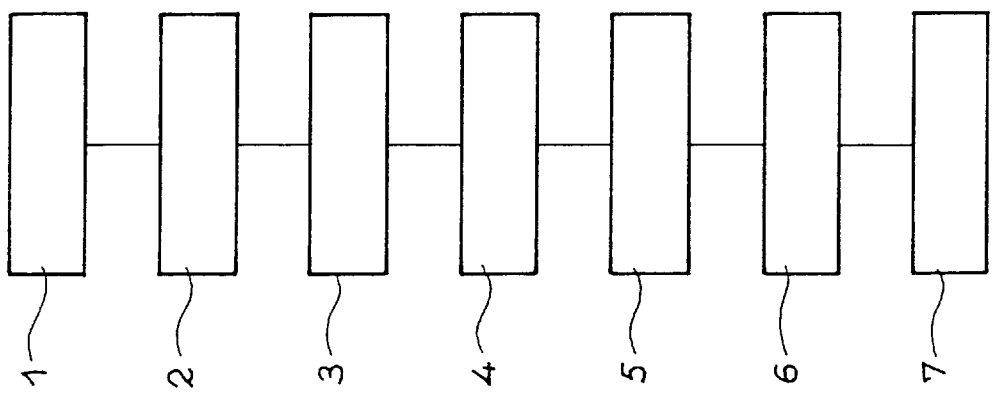

The document by V. I. ITIN, V. N. KHACHIN, V. E. GYUNTER, A. D. BRATCHIKOV and D. B. CHERNOV: "Production of Titanium Nickelide by self-propagating high temperature synthesis" translated from "Poroshkovaya Metallurgiya, No. 3(243), pp. 4–6, March 1983"describes a method of preparing nickelides of titanium in which elemental powders (1) of titanium and nickel are mixed in appropriate proportions and cold compressed (3) to form a blank which is subjected to reactive sintering (4) in a constant pressure reactor under an argon atmosphere, cooled, then placed in steel cladding (5) and extruded, drawn at 950° C., (6) so as to reduce the porosity, the cladding is then removed. This process is illustrated in FIG. 1.

The patent GB-A-2 220 425 relates to a method of preparation and of forming intermetallic materials such as NiAl, CoAl, NiAlCr, $Co_2TiAl$, $NbAl_3$, NbNiAl, TiAl, $Ti_3Al$, $Ni_3Al$, CuZnAl, NiTi, $Nb_3Sn$.

These materials are prepared by mixing elemental powders in particular quantities which are first of all formed by cold compression, then subjected to a second compression or compaction operation notably by extrusion carried out in such a way that the percentage deformation of the mixture is greater than 80% so as to reduce the porosity; finally, the final material is prepared by reaction sintering. The article by M. DAHMS: "Formation of Titanium Aluminides by heat treatment of extruded elemental powders" in "Materials Science and Engineering, A 110 (1989), L5–L8" describes the formation of titanium aluminides from elemental powders in which the mixtures of elemental powders of titanium and aluminium, in the desired proportions, are subjected to compression and extruded cold and drawn so as to produce densified bars and wires which are then subjected to reactive sintering in an argon atmosphere to give the final product TiAl. It would appear that the extra deformation provided by the extrusion and the drawing leads to reduced porosity in the sintered material. The article by K. B. MUELLER, S. NEUBERT, M. DAHMS: "Production of intermetallic TiAl by solid state reaction of extruded powders" (pp. 139–153) in the book "Advances in Powder Metallurgy and Particulate Materials —1992, Volume 7", relates to preparation of TiAl by a method which includes the mixing (2) of the elemental powders (1) of Ti and of Al in specific proportions, then a compression step (3) in order to obtain a cylinder which is subjected to deformation by extrusion at a low temperature, lower than the reaction temperature, using various techniques (drawing, rolling) (5). Preferably, the extrusion is carried out after the cylinder has been enclosed in a cladding made of an aluminium alloy AlMgSi.0.5 (4). After extrusion, the reaction sintering (6) leading to the formation of the intermetallic phase is carried out. This method is described in FIG. 2.

However, these methods are not yet totally satisfactory from a number of aspects: in effect, the reactive sintering must be carried out in furnaces operating under vacuum or in a controlled atmosphere made up of a inert gas, so as to provide protection of the powders during this operation, which necessitates an expensive and difficult procedure. On the other hand, the porosity of the final products is not, in most cases, satisfactory.

The objective of this patent application is to provide a reactive sintering method for obtaining intermetallic materials that overcomes the disadvantages of the known methods, that is to say, a method in which, an easy control of the chemical reaction which is occurring can be effected, in which the product can be protected, in an effective manner and at all stages, from oxidation, without requiring the use of specific apparatus or particular conditions such as high vacuum or a controlled inert atmosphere. This method must also allow the residual porosity or Kirkendall porosity to be limited. This method must also be easy to implement at an industrial level, have flexibility which allows it to be rapidly adapted to the manufacture of items differing in their shape and the composition of the intermetallic material which makes them up. Finally, this method must be capable of being carried out with current apparatus, with low consumption of energy, and with inexpensive and easily available starting materials.

The final intermetallic product obtained by the method must, on the other hand, have the desired structural and mechanical properties and be capable of being transformed both hot and cold.

These objectives and others have been achieved by the method of the invention of forming intermetallic materials by reactive sintering which includes the following series of steps:

preparation of a mixture of elemental metal powders in the desired proportions, compression of the powder mixture to obtain a tablet or "compact" of powders, this tablet or "compact" of elemental powder possibly being formed at low temperature, this method being characterised in that the compact of elemental powders, whether shaped or not, is then subjected to a cladding operation in a cladding resistant to pressure and heat and in which the clad product is treated by reactive sintering under conditions that allow an intermetallic compound to be obtained.

By means of the cladding, during the reactive sintering, the compact of powder only has a porosity of a few percent.

The porosity is then eliminated by a final hot densification step consisting, for example, of a hot transformation or a cold compression operation. The cladding is then generally removed in a final step. The cladding may also be preserved. Hence, in the case where it is desired to obtain a titanium nitride coating, the titanium cladding, which will then be nitrided, is preserved.

The essential characteristic of the invention comes specifically from following the steps that constitute the method, and in particular, from the fact that cladding is created on the elemental powder composition which is then immediately subjected to reactive sintering. Because of this, by carrying out the cladding right from the start of the process, immediately after the initial step of mixing and compressing the powders, it is possible to protect the product from oxidation during all the stages of manufacture, such as the reactive sintering in the course of which oxidation is liable to occur, these stages being after the cladding operation and being carried out on a protected clad product.

Since it is a clad powder composition that is being subjected to the reactive sintering operation, the porosity is limited during this operation, by means of the cladding which creates a pressure on the product preventing swelling and limiting the porosity to low values, generally less than 10%.

Furthermore, the hot transformation operations carried out in the final densification step are made much easier, by the presence of this cladding, preferably made of a refractory material : the cladding plays a different role to that of the claddings used in the prior art, also put into place before the reactive sintering, as in the British patent and the articles mentioned by DAHMS et al., but which are subjected to a cold deformation of the clad product, prior to this reactive sintering. In the case of the prior art, the cladding must permit deformation of the powder compact during an extra cold deformation step preceding the reactive sintering, whilst in this invention, this cladding, in fact, prevents deformation of the product during the reactive sintering and is then, and only after the reactive sintering, subjected to hot deformation to eliminate remaining porosity at high temperature. The final steps of reactive sintering and densification call for different properties of the material making up the cladding which must, preferably be more refractory and resistant to the pressure being used.

In the method according to the invention, the limitation of the porosity is obtained, on the one hand, by the presence of the cladding during the reactive sintering and, on the other hand, through the final densification notably by drawing, which takes place after the reactive sintering and is carried out at high temperature.

These hot transformation operations which allow a greater degree of deformation are also made much easier, according to the invention by the presence of the cladding and lead, particularly in the case of drawing, to a material being obtained with a microstructure finer than that obtained by cold deformation before the sintering. The specific sequence of steps of the method according to the invention allows the chemical reactions which are occurring to be easily controlled and permits easy adaptation of the method in accordance with the desired material and the starting materials. The method of the invention has great flexibility and high using adaptability.

Added to these technical advantages are also economic advantages linked to the use of less expensive starting powders, since we are concerned with elemental powders whose granulometry can be relatively coarse, for example, greater than 15 micrometers.

The method according to the invention permits the manufacture of products having a fine microstructure, an excellent capability for both hot and cold transformation, and mechanical properties and form memory which are, in certain cases, improved.

Figure 2:
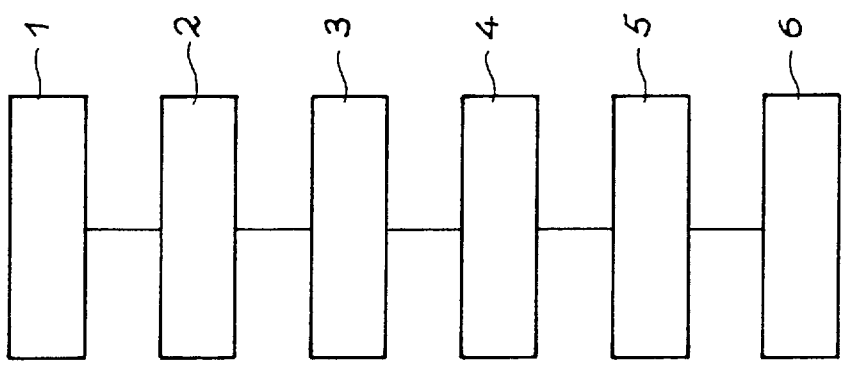

Other characteristics and advantages of the invention will be better made apparent by reading the description which follows, which is given of course as a non-limitative illustration, with reference to the appended drawings in which:

FIGS. 1 and 2, already described, are diagrams representing steps of the method of forming intermetallic materials according to the prior art, and FIG. 3 is a diagram representing steps of the method of forming intermetallic materials in accordance to the invention.

Referring to FIG. 3, it is noted that the method of the invention includes first of all a step of mixing (2) the elemental powders (1) in proportions corresponding to the composition aimed at. These powders which may number two or more are chosen from metal powders such as powders of titanium, aluminium, nickel, iron, niobium, chromium, zirconium, tantalum, vanadium, copper . . . or any other metal powder liable, by reaction with another metal, to form an intermetallic compound.

The mixture includes, first of all, the weight of elemental powders. At this stage, it is easy to incorporate one or several additional elements to improve the in-service characteristics of the final alloy; this may involve, for example, a ceramic powder chosen, for example, from oxides such as $Al_2O_3$, $Y_2O_3$, $ZrO_2$, borides such as $TiB_2$, carbides such as TiC, SiC, nitrides such as $Si_3N_4$ and their mixtures, to increase the hardness, or another agent such as Nb, Ta and W to improve the resistance to oxidation of TiAl, or Cr, Mn, Mo to increase the ductility of TiAl, or Fe to reduce the phase transformation temperatures of TiNi, or Zr and Hf to increase the phase transformation temperatures of TiNi, or any other additional element known by those skilled in the art and allowing an improvement in any property of the final product.

The weighed powders are then mixed (2) in a way known in the field of powder metallurgy, in any suitable apparatus and for a time sufficient to obtain an homogeneous mixture of the metal powders and possibly the additives mentioned above. The mixing is, for example, carried out in a "turbulate" type apparatus for a period of one hour. In a second step, the mixture is tabletted "compacted" (3), and possibly shaped by an extra operation. The compression of the powder mixture (3) is an ordinary operation in this technical field and may be carried out by any method known by those skilled in the art, for example, using a uniaxial press, or an isostatic press or an injection press.

All or part of the powders used being ductile, it is easy to give the powder mixture any form whatsoever, for example that of a billet, preferably or any other desired shape, even a complex one, either during the compaction operation itself with the aid of a forming mould, or by transformation, for example, by drawing or rolling at low temperature, preferably less than 400° C., or by machining. For example, the powder mixture could be subjected to isostatic pressing in a latex envelope to obtain a billet.

In accordance with the invention, the compacted and possibly shaped powder mixture is then subjected to a cladding operation (4) using an appropriate material chosen so that it resists later operations and, in particular, the final densification carried out hot: for this reason, the material is chosen from mild steel, stainless steel, titanium and its alloys.

This cladding is carried out in a classic manner, known to those skilled in the art, the thickness of the cladding must, on the other hand be sufficient to resist the pressure to which it is subjected during the reactive sintering and the subsequent operations. This thickness can be easily determined by those skilled in the art, and preferably will be, for an ingot of 50 mm, greater than 1 mm, and even more preferably between 3 mm and 20 mm, the preferred thickness is, for example 10 mm.

To prevent or limit any chemical reaction between the cladding and the product to be made, the compact of powders and/or the inside of the cladding can be coated by a diffusion barrier which can be, for example, a metal oxide, for example alumina, zirconia, yttria, or boron nitride or silica or mixtures thereof. The diffusion barrier can be laid down by any known technique, for example, a deposit can be laid down by painting on a suspension of powder of the compound forming the diffusion barrier in a suitable solvent, a suspension of alumina powder in alcohol being preferred.

Furthermore, to avoid cooling of the product during the densification operation (6) by thermo-mechanical treatment (drawing or rolling) and to facilitate the cooling of the cladding, a thermal insulator can be inserted between the cladding and the product, consisting of metal foil or felt made of mineral fibre, for example, a felt of silica, alumina or zirconia fibre or their mixtures or a metal foil of titanium, tantalum or any other material. This thermal insulator can also act as a diffusion barrier and preferably, has a thickness between 0.2 mm and 5 mm.

At this stage, it is possible to create a vacuum inside the cladding in order to remove any trace of oxygen and hence to improve the purity of the final product. The cladding is then closed off by the known sealable tube technique.

In accordance to the method according to the invention and the order of the steps that characterise it, the clad product is then subjected in a fourth step to a reactive sintering operation (5), that is to say that the product, with its protective cladding is brought to a temperature sufficient to bring about the conversion of the mixture of powders into an intermetallic compound. This temperature, which depends on the mixture of powders treated, is preferably between 500° C. and 1200° C.

The duration of the treatment can also vary and is, preferably, between 0.1 and 10 hours and can easily be determined.

The reactive sintering (5) may also consist of a treatment cycle comprising several phases carried out at different temperatures and for different periods of time.

As already mentioned above, the cladding must be sufficiently thick to resist the stresses from pressure due to the chemical reaction: it limits the creation of porosity (Kirkendall porosity) thereby in accordance to the invention. The final product will then have, according to the invention, a porosity less than 10%.

Because of the presence of the cladding, and in accordance to the method according to the invention, the product is protected from oxidation and the reactive sintering operation can then proceed in a furnace which does not have a good vacuum or which does not have a controlled atmosphere, for example, in a furnace under air, in contrast to the prior art methods which require furnaces under vacuum or under an inert atmosphere, for example, argon.

Consecutive with the reactive sintering operation, the product, still clad, whose porosity has been limited, generally to less than 10%, according to the method of the invention, and thanks to the presence of the cladding, is subjected, in a final densification step (6), to one or several treatments in order to eliminate the final porosity obtained after the preceding reactive sintering operation. This treatment is, in accordance with the invention, a hot treatment which, in combination with the reactive sintering on the clad product, allows to obtain an elimination of porosity clearly superior to the methods of the prior art, which carry out a cold deformation before the reactive sintering. Hence the clad product is subjected to one or several of the following treatments given as examples:

a thermo-mechanical treatment which can consist, for example, of one or several of the following operations: drawing, forging or rolling, preferably, drawing is used, since the method allows the creation of high degrees of deformation, which gives a fine microstructure, a hot uniaxial or isostatic compression The operating conditions for these treatments are known and/or can be easily determined by those skilled in the art in relation to the intermetallic compound TiNi or TiAl etc. For example, drawing can be carried out between 1000° and 1350° C. with an extrusion ratio between 4 and 25.

Finally, following the final densification step (6), the product is subjected to a uncladding operation (7) which can be carried out in any way known to those skilled in the art, for example, by chemical attack or by machining.

Optionally, the final product can be subjected to a thermal treatment to give the product the desired microstructure and mechanical properties. This thermal treatment is, for example, a hot isostatic compression or another treatment, under operating conditions easily determined, as a function of the intermetallic compound, by those skilled in the art, within a more reduced range, for example, the hot isostatic compression can be carried out at 1200° C. for 3 hours and at a pressure of 1500 bars.

Any of the thermal and/or surface treatments known in this technological field, such as an anticorrosion treatment, can be equally carried out on the final product.

The following examples, given as non-limitative illustrations, illustrate the method of the invention.

EXAMPLE 1

Preparation and forming of TiAl with a mild steel cladding, with densification by drawing at 1150° C. and hot isostatic compression at 1200° C. for 3 hours at 1500 bars.

An intermetallic material TiAl is prepared and formed by the following series of steps:
1. weighing the elemental powders: titanium 631 g, aluminium 341 g, chromium 27.4 g,
2. mixing for 1 hour in a turbulate
3. isostatic compression in a latex envelope to obtain a billet of 50 mm diameter and 120 mm height,
4. cladding of the powder compact in mild steel 10 mm thick with an alumina diffusion barrier (applied by painting a suspension of micron size alumina powder in alcohol),
5. reactive sintering: in a furnace in air, the clad product is subjected to the following cycle: 600° C./4H so that the reaction Ti+Al→TiAl takes place,
6. drawing with a 14 mm diameter die (extrusion ratio =14) at 1150° C.,
7. removal of the cladding by chemical pickling,
8. hot isostatic compression (HIC) 1200° C./3H/1500 bars.

The product thereby produced has a bending strength of 581 MPa±40 MPa.

EXAMPLE 2

Preparation and forming of TiAl with a 316 steel cladding, with densification by drawing at 1225° C.

An intermetallic material TiAl is prepared and formed by the following series of steps:
1. weighing the elemental powders: titanium 658 g, aluminium 342 g,
2. mixing for 1 hour in a turbulate
3. isostatic compression in a latex envelope to obtain a billet of 50 mm diameter and 120 mm height,
4. cladding of the powder compact in 316 steel 10 mm thick placing 1 mm thick silico-aluminate felt between the cladding and the product,
4a evacuation and sealing off of the tube
5. reactive sintering : in a furnace in air, the clad product is subjected to the following cycle: 600° C./4H so that the reaction Ti+Al→TiAl takes place,
6. drawing with a 14 mm diameter die (extrusion ratio= 14) at 1225° C.,
7. removal of the cladding by machining, The product thereby produced has a bending strength of 446 MPa±47 MPa.

EXAMPLE 3

Preparation and forming of TiAl with a titanium alloy cladding, with densification by drawing at 1150° C. and rolling at 1320° C.

An intermetallic material TiAl with a chromium addition, is prepared and formed by the following series of steps:
1. weighing the elemental powders: titanium 631 g, aluminium 341 g, chromium 27.4 g,
2. mixing for 1 hour in a turbulate
3. isostatic compression in a latex envelope to obtain a billet of 50 mm diameter and 120 mm height,
4. cladding of the powder compact by a titanium alloy "TA6V" 10 mm thick with a 1 mm thick silico-aluminate felt placed between the cladding and the product,
5. reactive sintering: in a furnace in air, the clad product is subjected to the following cycle: 600° C./4H so that the reaction Ti+Al→TiAl takes place,
6. drawing with a 35×9 mm die (extrusion ratio=14) at 1150° C.,
6a. rolling at 1320° C. to obtain a thickness of 4 mm through a 10% maximum pass,
7. removal of the cladding by machining,

EXAMPLE 4

Preparation and forming of TiNi with a mild steel cladding, with densification by drawing at 900° C.

An intermetallic material TiNi is prepared and formed by the following series of steps:
1. weighing the elemental powders: nickel 551 g, titanium 449 g,
2. mixing for 1 hour in a turbulate
3. isostatic compression in a latex envelope to obtain a billet of 50 mm diameter and 120 mm height,
4. cladding of the powder compact in mild steel 10 mm thick with an alumina diffusion barrier (applied by painting a suspension of micron size alumina powder in alcohol),
5. reactive sintering: in a furnace in air, the clad product is subjected to the following cycle: 900° C. for 1 hour, then 1000° C. for 1 hour, so that the reaction Ti++ Ni→TiNi takes place,
6. drawing with a 14 mm diameter die (extrusion ratio= 14) at 900° C.,
7. removal of the cladding by chemical pickling, The essential properties of this product are:
phase transformation temperatures : M(90%)=25° C., M(10%)=38° C., A(10%)=50° C., A(90%)=70° C.
tensile strength=800 MPa
ductility=45%
a form memory effect greater than 80% for deformations less than 4.5%.

EXAMPLE 5

Preparation and forming of TiNi with a mild steel cladding, with densification by hot isostatic compression at 1000° C. for 2 hours and at 1500 bars.

An intermetallic material TiNi with an addition of iron, is prepared and formed by the following series of steps:
1. weighing the elemental powders: nickel 529 g, titanium 450 g, iron 21 g,
2. mixing for 1 hour in a turbulate
3. uniaxial compression in a mould of a block, 100 mm diameter and 50 mm high,
4. cladding of the block of powder in mild steel 8 mm thick with an alumina diffusion barrier (applied by painting a suspension of micron size alumina powder in alcohol), 5. reactive sintering: in a furnace in air, the clad product is subjected to the following cycle: 900° C. for 1 hour, then 1000° C. for 1 hour, so that the reaction Ti+ Ni → TiNi takes place, 6. hot isostatic compression: 1000° C./2H/1500 bars, 7. removal of the cladding by chemical pickling, The essential properties of this product are:

phase transformation temperature A(10%)=−10° C.

EXAMPLE 6

Preparation and forming of TiNi with a mild steel cladding, with densification by drawing at 900° C. with an addition of hafnium.

An intermetallic material TiNi, with an addition of hafnium, is prepared and formed by the following series of steps:

- weighing the elemental powders: nickel 403 g,. titanium 230 g, hafnium 367 g,
- mixing for 1 hour in a turbulate
- isostatic compression in a latex envelope to obtain a billet, 50 mm diameter and 120 mm high,
- cladding of the compressed powder in mild steel 10 mm thick with an alumina diffusion barrier (applied by painting a suspension of micron size alumina powder in alcohol),
- reactive sintering: in a furnace in air, the clad product is subjected to the following cycle: 900° C. for 1 hour, then 1000° C. for 1 hour, so that the reaction Ti+Ni→TiNi takes place,
- drawing with a 14 mm diameter die (extrusion ratio=14) at 900° C.,
- removal of the cladding by chemical pickling, The essential properties of this product are: phase transformation temperature A(10%)=220° C.

EXAMPLE 7

Preparation and forming of TiNi with a mild steel cladding, with densification by drawing at 900° C. with an addition of zirconium.

An intermetallic material TiNi, with an addition of zirconium, is prepared and formed by the same series of steps as in Example 6, except that 185 g of zirconium is used instead of 367 g of hafnium in the initial mixture of elemental powders.

A phase transformation temperature A(10%)=180° C. is obtained.

I claim:

1. A reactive sintering method of forming intermetallic materials including the series of following steps:
   - preparing a mixture of elemental metal powders in the desired proportions,
   - compressing the mixture of elemental powders to obtain a compact of elemental powders,
   - wherein the compacting of elemental powders is then subjected to a cladding operation in a cladding resistant to pressure and to heat, and treating the clad product by reactive sintering under conditions that allow an intermetallic compound to be obtained, and subjecting this clad product, after the reactive sintering, to a final hot densification operation.

2. A method according to claim 1, which comprises removing the cladding after the final hot densification operation.

3. A method according to claim 1, wherein the elemental powders are selected from the group formed by elemental powders of iron, nickel, aluminum, titanium, niobium, chromium, zirconium, tantalum, vanadium and copper.

4. A method according to claim 1, which comprises preparing the mixture of elemental powders in the desired proportions, then by actual mixing.

5. A method according to claim 1, wherein the mixture of elemental powders includes, in addition, one or several additives to improve the properties of the final alloy.

6. A method according to claim 1, which comprises subjecting the compact thus obtained to a low temperature forming operation immediately after the step of compressing the powders.

7. A method according to claim 1, wherein the cladding is made in mild steel, stainless steel or a titanium alloy.

8. A method according to claim 1, which comprises coating the powder compact, the inside of the cladding or both with a diffusion barrier during the cladding step.

9. A method according to claim 1, which comprises inserting a thermal insulator between the cladding and the powder compact during the cladding step.

10. A method according to claim 1, which comprises evacuating the interior or the cladding during the cladding step and then closing the cladding using a sealable tube technique.

11. A method according to claim 1, wherein the cladding has a thickness of at least 1 mm.

12. A method according to claim 1, wherein the reactive sintering is carried out in a furnace, under vacuum at a temperature between 500° and 1200° C.

13. A method according to claim 1, wherein the reactive sintering is carried out in a furnace, in air.

14. A method according to claim 1, which comprises carrying out the final densification by subjecting the clad product to a thermo-mechanical treatment, hot uniaxial or isostatic compression or both.

15. A method according to claim 2, which comprises removing the cladding by chemical attack or by machining.

16. a method according to claim 15, which comprises additionally subjecting the uncladded product to an extra thermal treatment so as to improve the microstructure and the mechanical properties.

17. A method according to claim 5, wherein the additive is selected from the group consisting of ceramic powders, chromium, hafnium, zirconium, niobium, tantalum, tungsten, manganese, molybdenum, iron and their mixtures.

18. A method according to claim 6 which comprises carrying out the forming by compression using a forming mould, by low temperature transformation or by machining.

19. A method according to claim 8, wherein the diffusion barrier is made up of a material selected from the group consisting of metal oxides, boron nitride and their mixtures.

20. A method according to claim 9, wherein the thermal insulation consists of metal foil or mineral fibre felt.

21. A method according to claim 14, wherein said thermo-mechanical treatment consists of drawing, forging, rolling, or combinations thereof.

* * * * *